Sept. 30, 1924.                                                        1,510,149
                          G. H. KING
             MEANS FOR REPAIRING LEAKS IN METAL UTENSILS
                       Filed April 9, 1920
Fig 1
Fig 2
Fig 3
Fig 4
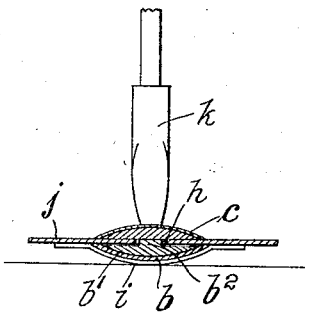
Fig 5
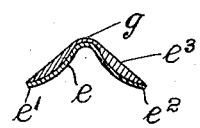
Fig 6
Fig 7
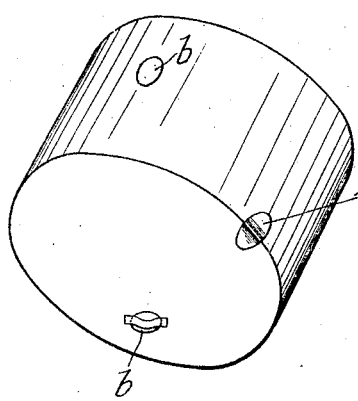
INVENTOR.
George Henry King Patented Sept. 30, 1924.

1,510,149

UNITED STATES PATENT OFFICE.

GEORGE HENRY KING, OF LONDON, ENGLAND.

MEANS FOR REPAIRING LEAKS IN METAL UTENSILS.

Application filed April 9, 1920. Serial No. 372,506.

*To all whom it may concern:*

Be it known that I, GEORGE HENRY KING, a subject of the King of Great Britain and Ireland, residing at London, England, have invented certain new and useful Improvements in Means for Repairing Leaks in Metal Utensils; and I do hereby declare the following to be a full, clear, and exact description of the invention, such as will enable others skilled in the art to which it appertains to make and use the same.

This invention has reference to an improved means for repairing leakages in metal utensils and the like.

According to this invention a disk or cap filled with solder is placed on one or each side of the leaky part of the utensil and fixed in position by the application of a hot iron.

Referring to the accompanying drawing:—

Fig. 1 is a central vertical section of a saucer-shaped cap, bent symmetrically about its center.

Figs. 2 and 3 are central vertical sections of saucer-shaped caps filled with solder and bent symmetrically about their centers.

Fig. 4 is a central vertical section of an inside and outside cup being fixed in position.

Figs. 5 and 6 are central vertical sections of caps filled with solder and bent symmetrically about straight lines passing through their centers.

Fig. 7 is a perspective view of a metal utensil showing three caps of various forms fixed in position.

Referring to Fig. 1 a thin metal disk $a$ is pressed or fashioned by any suitable means into a saucer-shaped cap, thus enabling said cap to be filled with solder or suitable alloy. A cap $b$ is filled with solder $b^1$ which has a circular projection $b^2$. A similar cap $c$ is filled with solder $c^1$ as shown at Fig. 3.

One or both of the caps $b$ and $c$ are used for repairing holes in flat and curved parts of utensils as shown in Figs. 4 and 7 respectively. The cap $d$ is similar to cap $b$, which, after having been filled with solder and cooled, is bent symmetrically about a straight line passing through its center at $f$. The two wings $d^1$ and $d^2$ thus formed are bent at approximately 90° with the solder $d^3$ and projection $d^4$ facing inwardly.

The cap $e$ is similar to the cap $c$, except that it is bent symmetrically about a line passing through its center at $g$. The two wings $e^1$ and $e^2$ thus formed being bent at an angle of approximately 90°, the solder facing outwardly.

Referring to the caps $b$ and $c$ which are for repairing leakages through flat and curved metal parts, such as the base and sides of a kettle, saucepan, or similar utensil, I preferably first temporarily fix a cap $b$ on the outside of the part $j$ with its projection of solder $b^2$ placed inside the leakage $h$ with a strip of gummed paper $i$ or by any other suitable means. I then turn the utensil so that it is standing upright on a table or bench, the gummed paper having held the cap in position whilst being turned.

I next place the cap $c$ on the inside of the utensil coinciding with the cap $b$ as shown in Fig. 4.

For finally fixing the caps $b$ and $c$, I take a soldering iron or any other similar shaped bar of metal $k$ which has been heated sufficiently, applying it with a firm pressure on the inside disk as shown, or if necessary the inner cap may be temporarily fixed in position and the hot iron $k$ applied to the outer surface of the outer cap.

The caps $d$ and $e$ are applied in the same manner as the caps $b$ and $c$, hereinbefore described for repairing leakages at the jointed or bottom rim of curved and flat parts of a utensil, as shown in Fig. 7.

What I claim and desire to secure by Letters Patent of the United States of America is:—

1. Devices for repairing leakages in metal utensils, comprising a pair of dished metal caps each filled with solder and adapted to be applied to opposite sides of a utensil, so as to cover a leakage therein, each of said caps being bent upon itself along a line passing through its center.

2. Devices for repairing leakages in metal utensils, comprising a pair of dished metal caps adapted to be applied to opposite sides of a metal utensil, so as to cover the leakage therein, each of said caps being filled with solder, and at least one of said caps having a projection thereon adapted to enter the leakage in the utensil.

3. Devices for repairing leakages in metal utensils, comprising a pair of dished metal caps filled with solder, each of said caps being bent upon itself along a line passing through its center, and at least one of said caps having a projection thereon adapted to enter the leakage in the utensil.

In witness whereof I affix my signature.

GEORGE HENRY KING.